United States Patent [19]
Robertson

[11] 3,732,807
[45] May 15, 1973

[54] METHOD AND APPARATUS FOR PRINTING HOLLOW ARTICLES

[75] Inventor: Elmer L. Robertson, Overland Park, Kans.

[73] Assignee: Ethyl Development Corporation, Kansas City, Mo.

[22] Filed: June 28, 1971

[21] Appl. No.: 157,401

[52] U.S. Cl. .......................101/11, 101/44, 101/316
[51] Int. Cl. ..........................B44c 1/14, B41f 17/24
[58] Field of Search............101/9–11, 44, 316, 318, 101/310, 306, 301, 297, 298, 287

[56] References Cited

UNITED STATES PATENTS

| | | | |
|---|---|---|---|
| 2,751,701 | 6/1956 | Grupe | 101/11 |
| 2,567,232 | 9/1951 | Nordquist et al. | 101/11UX |
| 3,411,439 | 11/1968 | Moes et al. | 101/38 R |
| 2,751,841 | 6/1956 | Grupe | 101/11 X |
| 3,124,066 | 3/1964 | Crane et al. | 101/44 |
| 2,647,337 | 8/1953 | Martin | 101/44 UX |

Primary Examiner—Robert E. Pulfrey
Assistant Examiner—Clifford D. Crowder
Attorney—Donald L. Johnson

[57] ABSTRACT

A process and apparatus for hot stamp printing of hollow articles, particularly plastic containers, utilizing pigment coated films or foils. The apparatus uses a split die holder which contains one or more heated elements providing the indicia desired to be printed on the exterior surface of the plastic container. One-half of the die holder is fixedly positioned, and the second half of the die holder is adapted to be raised into position to enclose the hollow plastic container within the die cavity which has the same shape as the container being printed. A mechanical indexing source is utilized to move the bottle into the split die holder, and a single pneumatic source is utilized to close the split die holder around the bottle.

15 Claims, 14 Drawing Figures

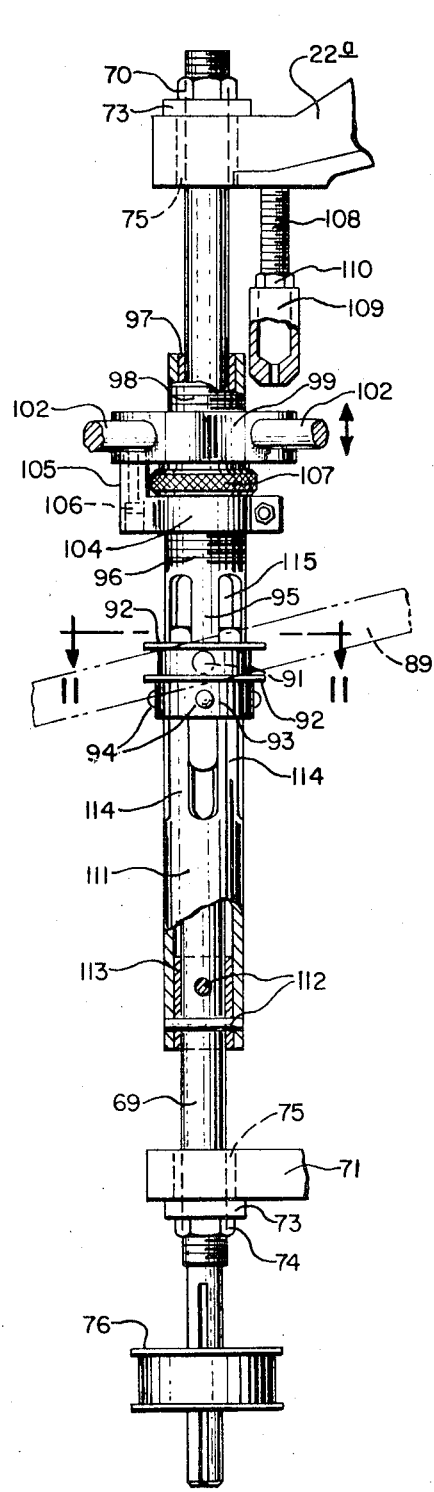
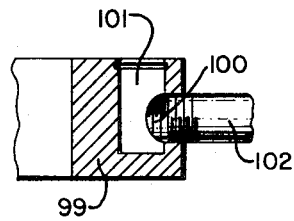
FIG. 10.
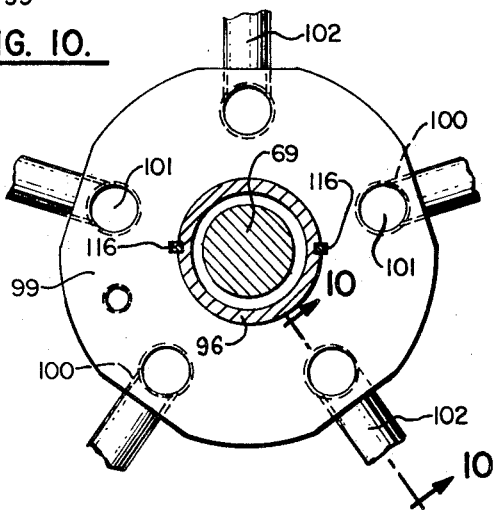
FIG. 9.
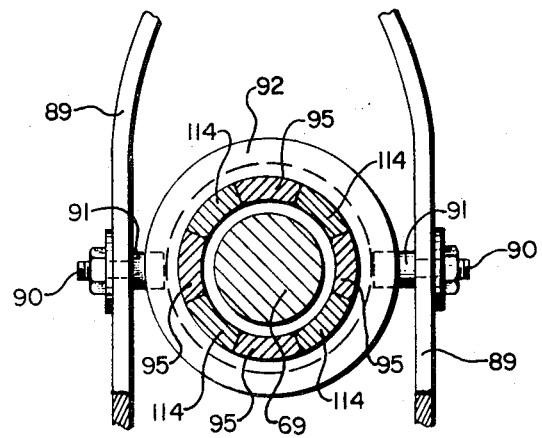
FIG. 11.
FIG. 8.

METHOD AND APPARATUS FOR PRINTING HOLLOW ARTICLES

BACKGROUND OF THE INVENTION

1. Field of the Invention

This invention relates to a method and apparatus for printing indicia on hollow articles using a hot stamping technique.

2. Description of the Prior Art

Hot stamp printing has been used for a number of years to supply decorative relief or printed indicia upon the surface of plastic objects, in particular upon the faces of plastic bottles and containers. In this art a strip of foil carrying either a pigment coating or a thin metal coating thereon is interposed between the article desired to be imprinted and a die plate which contains a heated element having the desired display or indicia thereon. The article is pressed firmly against the heated die, and the pigment is transferred from the carrier foil to the surface of the plastic container by partially melting the container surface and fusing the pigment coating thereto.

One method and apparatus for hot stamp printing of plastic bottles that is commercially used is that described in U.S. Pat. No. 2,751,701. In this apparatus the bottles are carried by arms on a rotating shaft and positioned sequentially between open halves of a split die holder. Each die holder contains a heated die plate which is pressed against a foil that is positioned over the surface of the die plate when the mold halves are pressed together. Air pressure is applied to the interior of the bottle to force the bottle into conformance with the die cavity and to firmly seat the bottom wall against the heated die plate and, thus, effect the transfer of the indicia thereto.

While the apparatus disclosed in the foregoing patent has been found suitable for commercially producing hot stamp decorated plastic bottles, the complexity of the apparatus and the high investment cost have somewhat restricted the use of such apparatus in the art. From the foregoing it can be seen that the plastic bottle decorating industry could use a hot stamp machine and a method which would speed up the production of hot stamp printed plastic containers. Additionally, there is a need for a hot stamp machine and method which will utilize a fairly simple machine which can be constructed at substantially less cost than required for machines presently used in hot stamping plastic containers. Additionally, there is a need in the industry for a hot stamping machine which is capable of being used in multiples in order to provide for hot stamping indicia on plastic containers using a number of different colors or types of pigment foils. Presently, the application of more than one color hot stamped indicia on one surface of a plastic bottle requires repeat runs through the same or similar machine to achieve two or more colors on one face of the container.

SUMMARY OF THE INVENTION

It is an object of the present invention to provide a method and apparatus for hot stamp printing of plastic containers which utilizes an apparatus having a simplified construction.

It is another object of the present invention to provide a method and apparatus for hot stamp printing of hollow plastic containers which will increase the speed of printing the containers.

It is still another object of the present invention to provide a method and apparatus for hot stamp printing of hollow plastic containers which is capable of applying a number of different colors to the containers.

It is also an object of the present invention to provide an apparatus for hot stamp printing of hollow plastic containers which is more economical to construct than apparatuses used heretofore.

The foregoing objects and other advantages brought out hereinafter are realized in the apparatus aspects of the present invention in an apparatus for hot stamp printing of hollow plastic containers which includes a split die holder having a cavity of substantially the same size and shape as the container. Means are provided for rigidly positioning the first half of the split die holder. Means are also provided for positioning the container in the cavity in the first half of the split die holder. Means for moving the second half of the split die holder into position with the first half to enclose the container within the cavity are provided. Means for introducing a compressed gas into the interior of the container through the positioning means are also provided.

The process aspects of the present invention are realized in a process for hot stamp printing of hollow plastic containers which include the steps of rigidly positioning the first half of a split die holder, the die holder having a cavity of substantially the same size and shape as the container. The second half of the split die holder is movably positioned opposite and out of contact with the first half of the split die holder. The container is positioned between the open first and second die holder halves. The container is moved into the cavity of the first half of the die holder, and the second half of the die holder is moved into position adjacent the first half to enclose the container within the cavity. A compressed gas is introduced into the interior of the container.

BRIEF DESCRIPTION OF THE DRAWING

FIG. 8 is an elevational view, partially in section, of the indexing, rotatable drive mechanism for elevating the die holder and rotating the bottle into position between the die halves;

FIG. 9 is an enlarged, top plan view of the cylindrical mounting block for the rotating arms that carry the bottles into the die holder hlaves;

FIG. 10 is an enlarged, sectional view of FIG. 9 taken along the line 10—10;

FIG. 11 is a cross-sectional view of the apparatus of FIG. 8 taken along the line 11—11;

DESCRIPTION OF THE PREFERRED EMBODIMENTS

Figure 1:
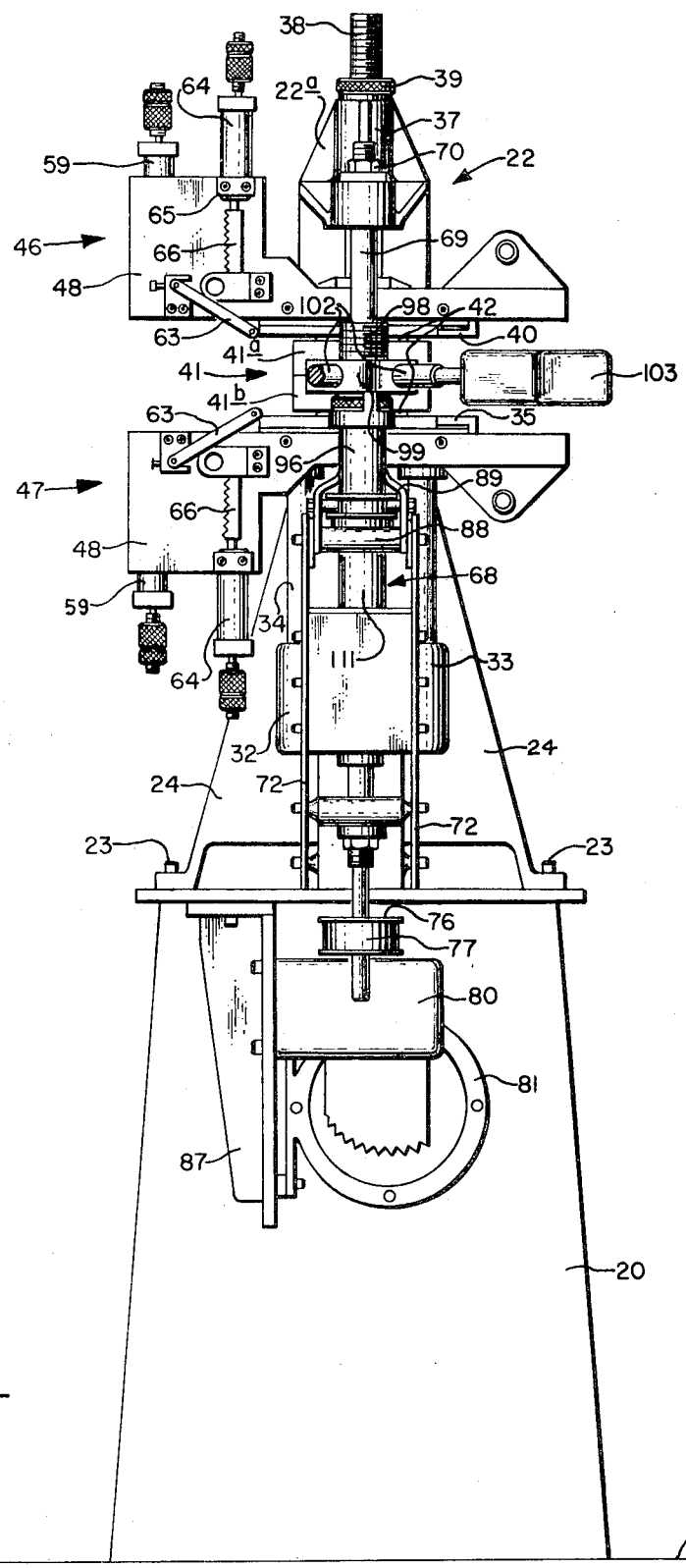
FIG. 1 is an elevational, front view of an apparatus for hot stamp printing of hollow plastic containers constructed in accordance with the present invention.
Figure 2:
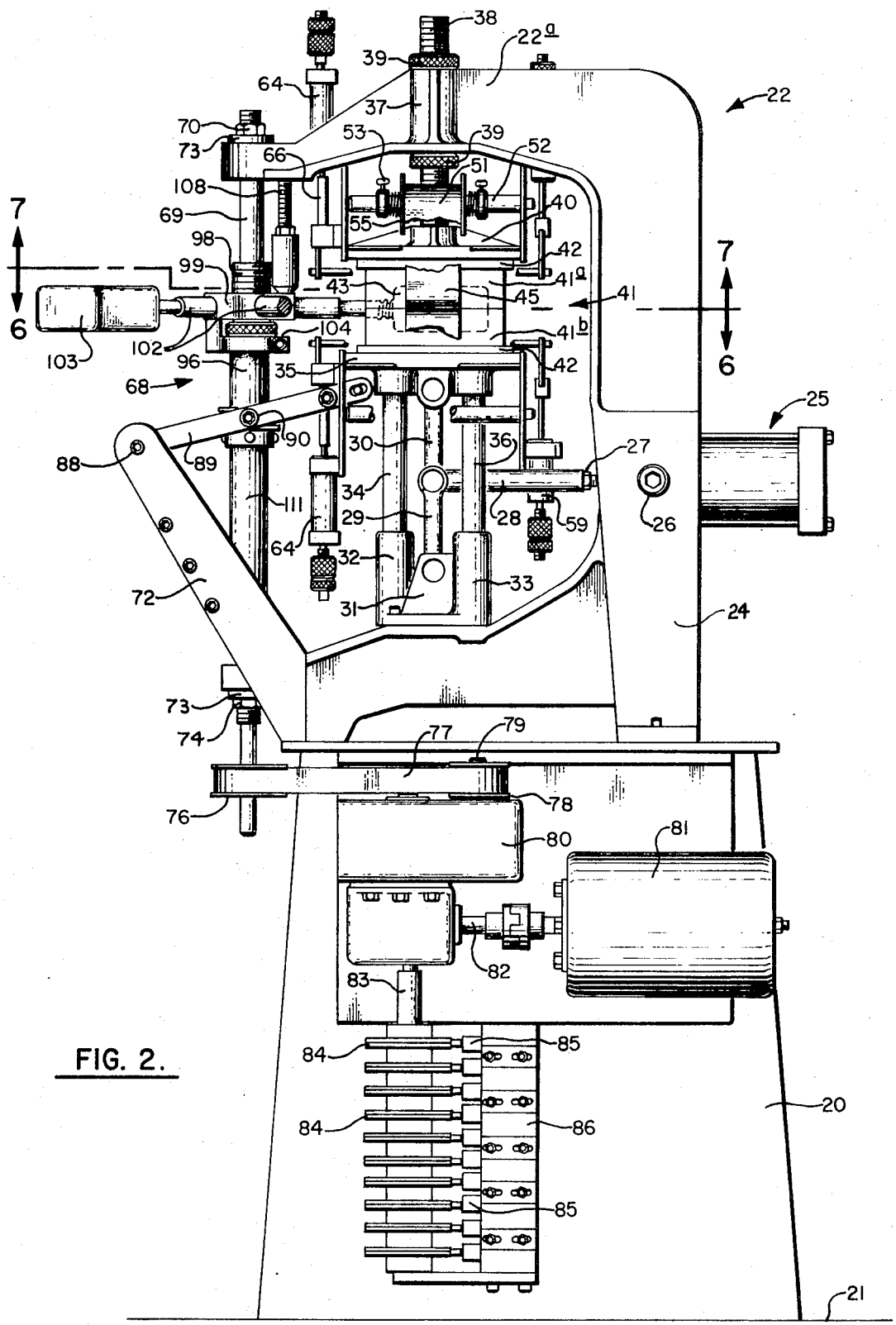
FIG. 2 is a right-hand-side, elevational view of the apparatus of FIG. 1.
Figure 3:
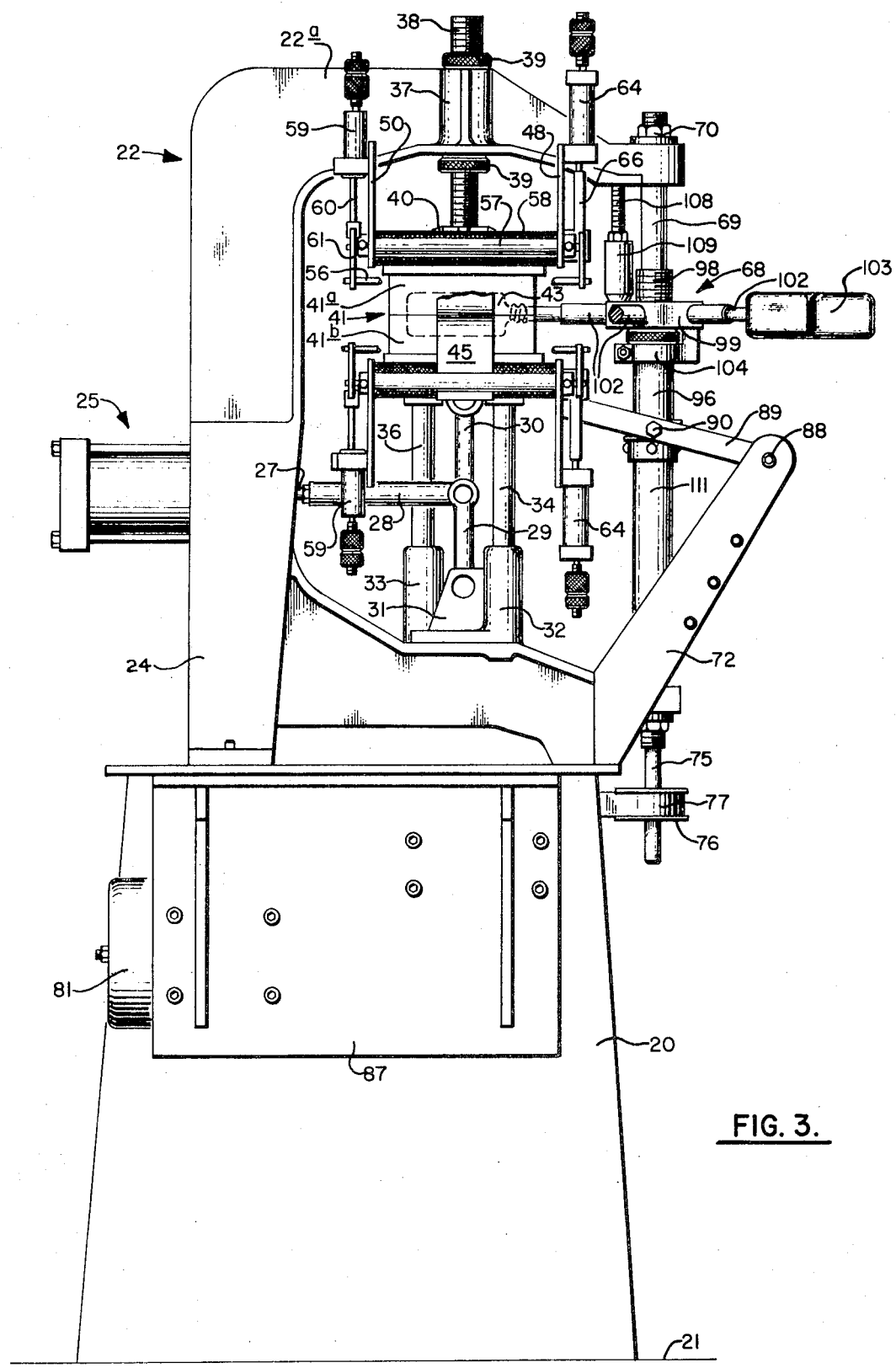
FIG. 3 is a left-hand-side, elevational view of the apparatus of FIG. 1.

Referring now to FIGS. 1, 2 and 3, the hot stamping apparatus of the present invention is mounted on a generally rectangular base 20 which is adapted to rest on a floor surface 21. The hot stamp apparatus includes a generally C-shaped support frame, designated generally 22, which is attached to the base by means of bolts 23. The rear lower portion (see FIG. 1) of the frame is provided with two downwardly extending, lateral wing portions 24—24 which provide stability for the support frame. The frame is provided with an opening in the lower, central, rear portion thereof (not shown) in which is mounted a pneumatic, double-acting power cylinder, designated generally 25. The power cylinder is pivotably mounted in the opening in the frame 22 by means of a front trunnion 26. The power cylinder 25 is provided with a piston rod 27 which is threadedly connected to the inner end of a push rod 28. The outer end of push rod 28 is pivotably connected to lower link arm 29 and also to upper link arm 30. The lower end of lower link arm 29 is pivotably attached to a mounting block 31 which is, in turn, attached to the support frame 22. The mounting block 31, which is preferably formed from a casting, includes two vertically extending, integrally formed sleeve guides 32 and 33. The lower end of vertically extending guide rod 34 is slidably received within the sleeve guide 32. The upper end of the guide rod is attached to the lower face of the lower die holder platen 35. The lower end of guide rod 36 is also slidably received in sleeve guide 33, and the upper end thereof is attached to the lower surface of the lower die holder platen 35. The upper end of upper link arm 30 is pivotably attached also to the bottom surface of the lower die holder platen 35.

The upper arm 22a of the support frame 22 is provided with an integrally formed, cylindrical sleeve 37. The threaded support rod 38 is slidably received within the sleeve 37 and can be locked in a fixed position within the sleeve by means of upper and lower locking nuts 39—39. The lower end of the threaded support rod 38 is received in a boss provided in the top surface of upper die holder platen 40.

Positioned between lower die holder mounting platen 35 and upper die holder mounting platen 40 is a split die holder, designated generally by the numeral 41. The split die holder 41 includes upper die holder half 41a and lower die holder half 41b. The upper die holder half 41a is removably attached to the upper die holder mounting platen 40 by means of bolts (not shown). An insulating plate 42 is positioned between a flat back face of upper die holder half 41a and the lower face of the upper die holder mounting platen 40 to prevent transmission of heat from the upper die holder half 41a into the mounting platen 40. This insulating plate may conveniently be made of asbestos or other low heat conducting material. The lower die holder half 41b is likewise attached to the upper surface of lower die holder mounting platen 35 by means of bolts (not shown) and is separated therefrom by an insulating plate 42. When the upper and lower die holder halves are in the closed position, as shown in FIGS. 1, 2 and 3, the split die holder is provided with a cavity 43 internally which has substantially the same shape as the hollow article to be received therein and subsequently imprinted. As seen more clearly in FIGS. 6 and 7, the upper and lower die holder halves are each provided with an axial opening 44 which defines the neck shape of the bottle and receives the neck of the bottle therein. Either one or both of the die holder halves 41a and 41b are provided with an electrically heated die insert (not shown) which contains the indicia desired to be printed upon the plastic container. Additionally, the upper and lower die holder halves are also provided with channels therein (not shown) and a source of circulating cooling fluid whereby the body of the dies may be maintained at a set temperature to avoid heat transfer to the bottle. The construction of dies and of split die holders is well known in the art, and reference is made to U.S. Pat. No. 2,751,701, discussed previously, for a further disclosure of suitable dies and die holders and their construction and operation. The disclosure of U.S. Pat. No. 2,751,701 is hereby incorporated herein by reference.

Referring now to FIGS. 1, 5, 6 and 7, the pigmented foil or film 45 is transported across the face of the upper mold half 42a by means of an upper film transport assembly, designated generally by the numeral 46. A lower film transport assembly, designated generally by the numeral 47, transports the film across the face of the lower die holder half 41b and has a construction similar to that of the upper film transport assembly. The upper film transport assembly 46 includes a front, vertically extending support bracket 48 which is attached to the upper die holder platen 40 by means of screws 49. A back support bracket 50 is attached to the back side of upper die holder platen 40 also by means of screws 49. A supply roll 51 of pigmented film or foil is carried on the shaft 52 rotatably mounted between the front and back support brackets 48 and 50. Slidable locking collars 53—53 are mounted on shaft 52 on either side of the supply roll 51 and apply compression to springs 54 which, in turn, apply pressure to alignment collars 55 to position the film on the shaft 52. The film passes over a rod 56 mounted between the front and back brackets. The free end of the film is passed between a knurled metal roller 57 and a rubber covered roller 58 which are mounted between the front and back brackets at the opposite end of the film transport assembly from the storage roll.

Figure 5:
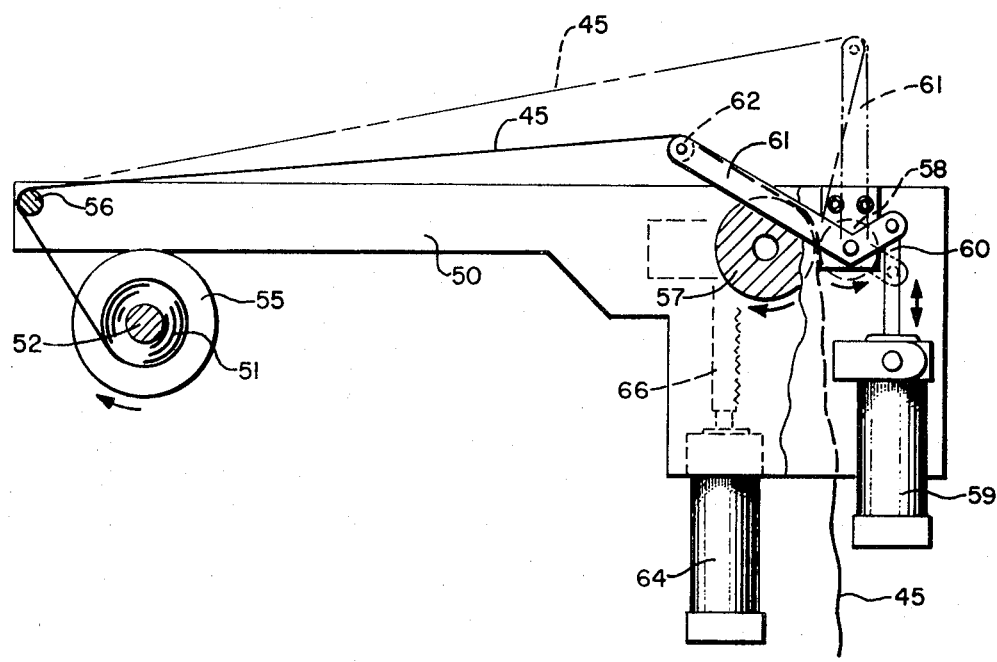
FIG. 5 is a side elevational view, partially in section, showing the construction of the pigment-coated film or foil takeup mechanism.

After each bottle is printed, it is necessary to shift the pigment-coated foil to place a new section of foil within the cavity of the die holders to print the next bottle. The foil is shifted by means of an air cylinder 64, as seen more clearly in FIG. 5. As seen in FIGS. 1 and 5, the takeup power cylinder 64 is attached to front support bracket 48 by means of a clamp 65. A toothed rack 66 is attached to the end of the shaft of the takeup power cylinder 64 and actuates a gear wheel 67 (see FIG. 7) which is fixedly attached to one end of the knurled metal takeup roll 57. The gear wheel 67 is connected to the end of the shaft which carries the roller 57 by means of a one-way clutch (not shown) whereby, upon retraction of the toothed rack 66, the gear wheel rotates freely on the end of the shaft. Takeup power cylinder 59 has a cylinder rod 60 attached to lever arm 61 which is pivoted on the end of rubber covered roller 58. Rod 62 extends underneath the foil 45 and has one end attached to lever arm 61 and the other end attached to support arm 63 which is pivotably connected to the other end of the idler roll 58. As seen in FIG. 5, when the cylinder 59 is actuated, cylinder rod 60 is pulled down, thus raising lever arm 61 to the position shown in dotted outline in FIG. 5 and, thus, providing slack in the foil 45 forward to permit conformation of the foil to the die holder cavity when pressed into the cavity by the bottle wall. The cylinder then returns to its original position. The waste foil is collected in a storage container (not shown).

Figure 6:
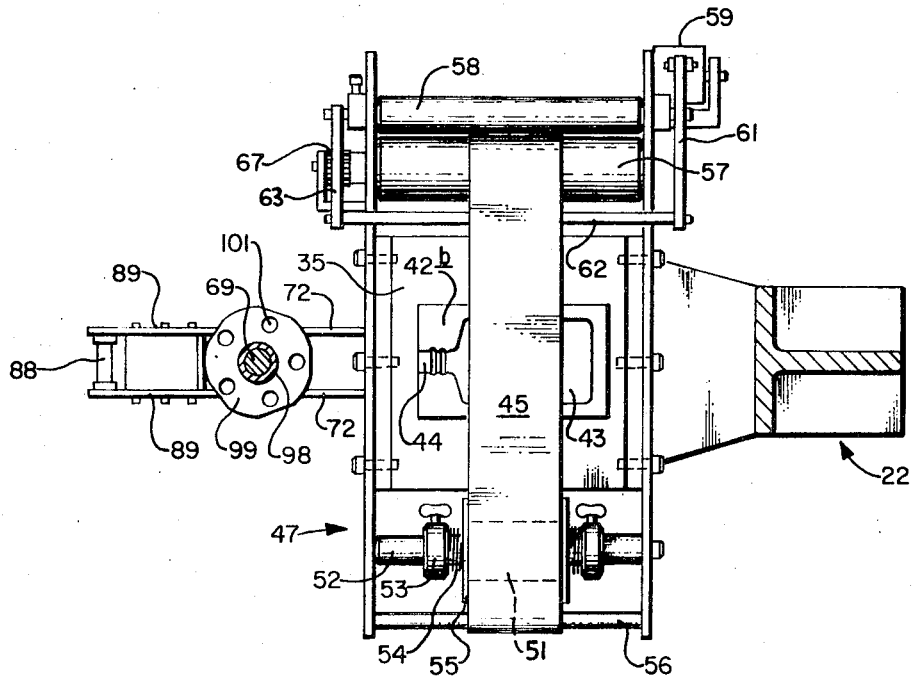
FIG. 6 is a sectional view of the apparatus of FIG. 2 taken along the line 6—6.
Figure 7:
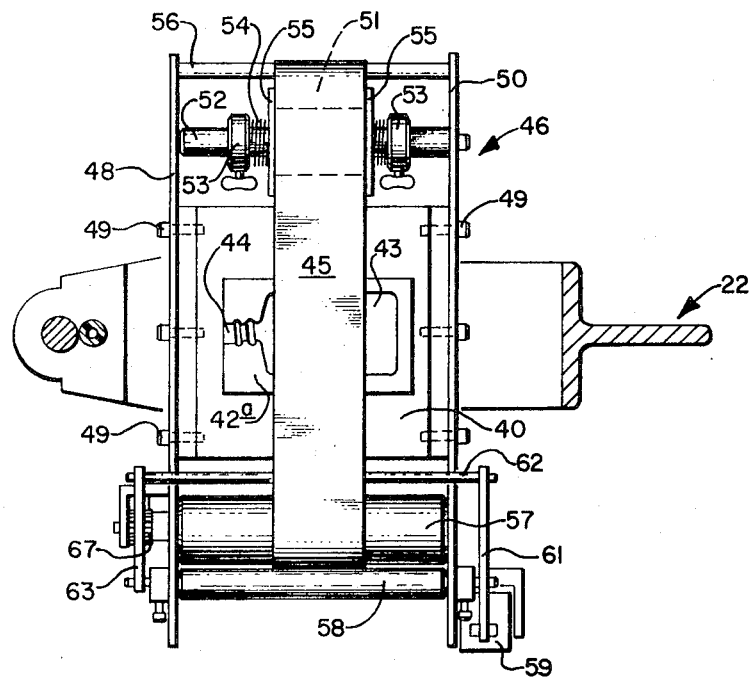
FIG. 7 is a sectional plan view of the apparatus of FIG. 2 taken along the line 7—7.

As can be seen in FIG. 6, the lower film transport assembly 47 is constructed of the same elements, except they are reversed in direction, in order to provide the same functions as carried out by the upper film transport assembly.

Referring now to FIGS. 1, 2, 3 and 8, the hot stamp apparatus includes a rotatably mounted turret assembly, designated generally by the numeral 68. The turret assembly is mounted on frame 22 and includes a shaft 69 which is received in bushings 75–75 provided in openings in the upper and lower ends of the frame 22 and is rotatably attached thereto by means of nuts 70 and 74. Needle thrust bearings 73–73 are provided between the nuts 70 and 74 and the frame ends to permit rotation of the shaft 69. The upwardly directed support brackets 72–72 are fixedly attached to the lower arm of the support frame 22. Drive pulley 76 is fixedly attached to the lower end of the drive shaft 69. Drive belt 77 connects drive pulley 76 to power pulley 78 which is driven by shaft 79 extending upwardly from indexing gear box 80 attached to the frame 20. In indexing gear box 80 there are provided cams and followers (not shown) which intermittently drive shaft 69 through scheduled, sequential increments to position the bottles within the cavity of the die holder. Indexing gear box 80 is driven by electric motor 81 through drive shaft 82. Extending downwardly from indexing gear box 80 is a lower or cam drive shaft 83 on which are mounted a plurality of generally circular cams 84. The cams actuate individual microelectrical switches 85 which are mounted on support bracket 86. The plurality of electrical switches 85 are a part of the electrical circuits which control the energization of the power cylinder 25 and the actuating and takeup cylinders 64 and 59 for the foil takeup mechanism. The indexing gear box 80, electrical motor 81, cam shaft 83 and bracket 86 are supported by means of a reinforced support bracket 87 which is attached to the underside of the frame 20, as may be seen more clearly in FIGS. 1 and 3.

Figure 4:
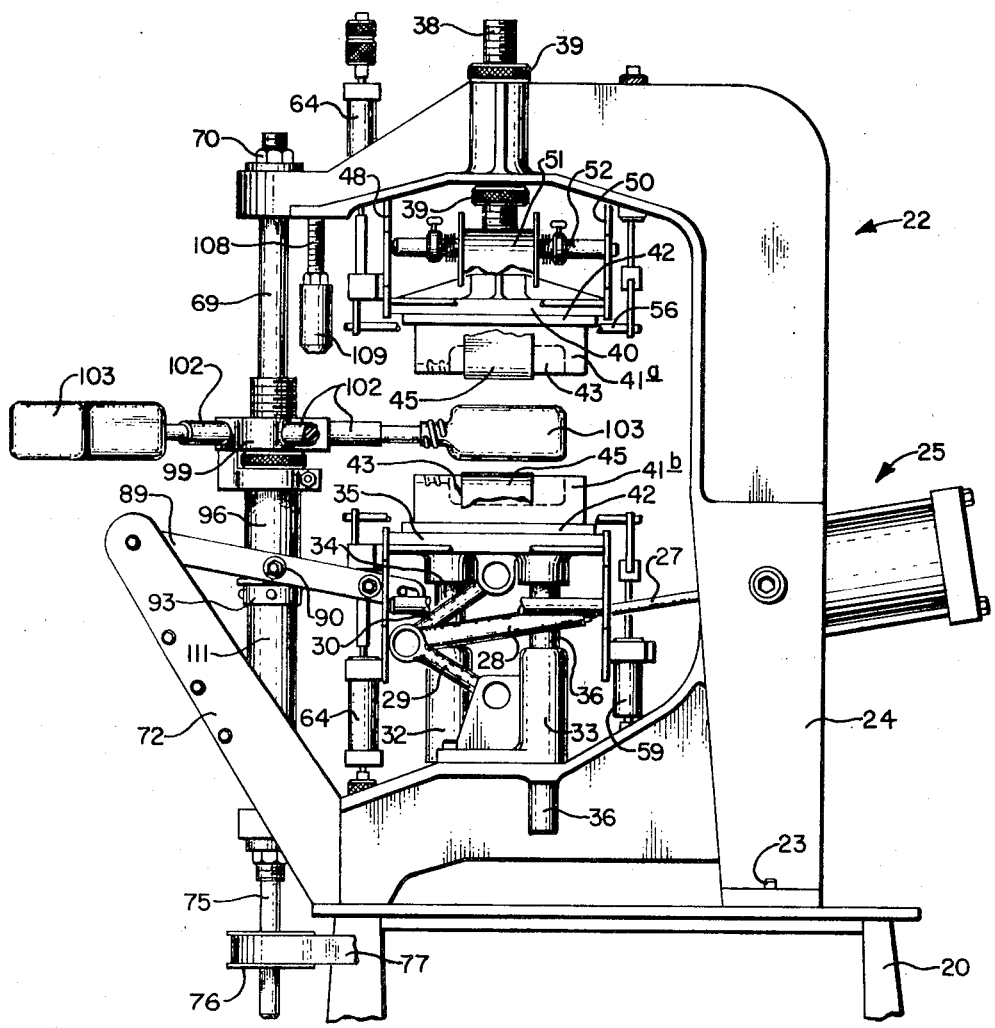
FIG. 4 is a right-hand-side, elevational view similar to FIG. 2, but showing the apparatus with the die holders in the open position.

As seen in FIGS. 1, 2 and 3, the upper ends of spaced apart support brackets 72–72 support a pivot pin 88 on which is pivotably mounted the lower end of a yoke assembly 89. As seen in FIGS. 2 and 4, the upper end of the yoke assembly 89 is pivotably mounted on the lower die holder platen 35 and is actuated by the movement of the platen. As seen more clearly in FIGS. 2, 8 and 11, each arm of the yoke assembly 89 is provided in its respective mid-portions with pins 90–90 which have mounted on their inner ends roller bearings 91–91. The roller bearings are received between spaced apart collars 92–92 which are provided on an annular sleeve 93. The annular sleeve 93 is attached by means of bolts 94 to downwardly projecting fingers 95 which form the lower portion of movable upper cylindrical sleeve 96. Upper cylindrical sleeve 96 is slidably mounted on rotatable rod 69 by means of a cylindrical bushing 97 received in the upper end of the sleeve. The upper end of the sleeve 96 is provided with threads 98.

Figure 12:
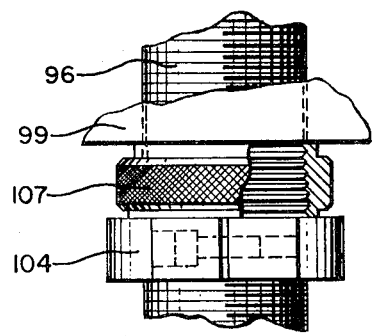
FIG. 12 is an enlarged, elevational view of the locking collar device for the turret assembly.

An annular turret body 99 is slidably received over the threaded upper end of the cylindrical sleeve 96. As seen more clearly in FIGS. 9 and 10, the turret body is provided with a plurality of spaced apart, threaded openings 100 in its outer cylindrical surface. A plurality of cylindrical bores 101 are provided on the top surface of the turret body to intersect the openings 100 provided on the cylindrical surface of the body. Each of the threaded openings 100 in the turret body threadedly receives the inner end of a support arm 102 which is adapted to carry on its outer end plastic bottle 103 upon which the hot stamp printing is to be affixed. The turret body 99 is locked to upper cylindrical sleeve 96 for rotation therewith by means of two keys 116—116 and a locking collar 104 positioned below and attached to the turret body 99. Locking collar 104 is provided with an upwardly extending arm 105 which provides an opening therein for bolt 106 for connection to the turret body 99. As seen more clearly in FIG. 12, knurled hand nut 107 is threadedly received on cylindrical sleeve 96 and is positioned between turret body 99 and the locking collar 104. By loosening the locking collar and rotating the knurled nut 107, the position of the turret and extending support arms 102 can be adjusted upwardly or downwardly on sleeve 96.

An air conduit 108, having an outer threaded surface, has its upper end attached to the upper arm 22a of the support frame and has affixed to its lower end a hollow tip 109 which is threadedly received on air conduit 108 and can be locked thereon by means of nut 110. As can be seen, particularly in FIG. 8, the lower end of the hollow tip 109 is beveled and is adapted to make an air seal with the slightly beveled surface at the top body of the turret 99 to thereby inject air into the openings 101 and, thus, through the hollow support arms 102 to the interior of the bottles 103 to expand the bottles against the pigmented foil and the die inserts in the die holder 41. A source of clean, compressed air (not shown) is connected to the upper end of air conduit 108.

Lower cylindrical sleeve 111 is attached to drive shaft 69 at the lower end of the sleeve for rotation therewith by means of pins 112—112. Spacer bushing 113 is positioned between the lower end of the sleeve 111 and the drive shaft 69. The upper end of the lower cylindrical sleeve 111 is provided with a plurality of fingers 114 which are slidably received in the slots 115 defined by the spaced apart fingers 95—95 on the upper sleeve 96. As seen more clearly in FIG. 11, each downwardly extending finger 95 is slidably received between the two adjacent, upwardly extending fingers 114—114 whereby the upper sleeve 96 can be moved upwardly and downwardly on rotatable shaft 69, but is subject to rotation by engagement with the fingers 114 on the lower sleeve 111 which is driven through drive shaft 69.

The process of hot stamping plastic bottles utilizing the herein described apparatus will be described with reference first to FIGS. 1, 2 and 4. At the start of the hot stamping cycle, the apparatus components are in the positions depicted in FIG. 4 of the drawing. Piston rod 27 is in the extended position which forces push rod 28 forward causing the upper link arm 30 and lower link arm 29 to pivot at the ends thereof. As the upper link arm 30 pivots, it pulls the lower die holder platen 35 downwardly, and guide rods 34 and 36 slide through sleeves 32 and 33 to the lower position shown in the drawing. This action moves downwardly the lower die holder half 41b and provides a clear space between this die holder half and the fixedly positioned upper die holder half 41a to position the plastic bottle 103 therebetween. When the lower die holder mounting platen 35 moves downwardly, it also moves into the down position the upper end of the yoke assembly 89 which, in turn, moves the upper cylindrical sleeve 96 downwardly on shaft 69 thereby carrying the turret mechanism to its loading position between the open halves of the die holders 41a and 41b. The height of the turret 99 is adjusted by means of knurled lock nut 107 as described hereinbefore to provide clearance for the walls of the bottle between the upper die half holder 41a and the lower die half holder 41b. For large diameter bottles it will be necessary to move the turret body 99 towards the upper end of the sleeve 96. Additionally, more clear space can be attained between the matching faces of the open die holders 41a and 41b by moving upwardly the upper die holder platen 40 by means of the threaded support rod 38 and locking nuts 39—39. Thus, the apparatus of the present invention can be utilized to hot stamp either very small containers, intermediate size containers or relatively large containers without an unduly long setup time between runs.

Plastic bottles for imprinting are placed upon the ends of support arms 102 either by hand or by an automatic loading machine. Electric motor 81 is energized, and gear box 80 moves through its cycle to incrementally rotate the shaft 69 through the belts and pulleys attachment to index one of the arms 102 carrying the bottle 103 to a position directly between the open die holder halves 41a and 41b. One of the cams 84 then actuates one of the electrical switches 85 to reverse the pressure of the gas in the pneumatic power cylinder 25, thus retracting the piston rod 27, pulling rod 28 inwardly and causing the upper and lower toggle arms 29 and 30 to elevate the lower die holder platen 35 and the lower die half 41b upwardly into position adjacent the upper die holder half 41a. As lower die holder platen 35 moves upwardly, yoke 89, which is attached at its outer end to the die holder platen, moves the upper sleeve 96 upwardly carrying the turret mechanism and the bottle 103 gradually into the cavity 43 of the upper die holder half 41a. By properly positioning the turret 99 on the movable sleeve 96, the bottle is moved vertically at a rate which is slightly slower than the rate which the lower die holder half 41b moves upwardly. The rate of vertical movement of the bottle 103 is adjusted so that just as die holder halves 41a and 41b come to their stop position, the bottle is positioned symmetrically within the cavities 43—43 of the closed die holder halves. Air pressure is then applied to the interior of the bottle within the die holders by means of air conduit 108, nozzle 109, turret 99 and hollow support arms 102. The pressure applied is generally from about 60 to about 150 psi, preferably from about 95 to about 125 psi. The bottle walls are, thus, expanded firmly against the strip of foil carried over each face of the bottle, and the foil is tightly pressed against the raised lettering on the heated die or dies (not shown) within the die holders which are heated by electrical heaters (not shown). The pigments are transferred from the foil strip to the bottle faces and are fixedly attached thereto. After a short interval control by the timing mechanism, the control assembly reverses the air pressure on cylinder 25 to draw the lower die holder half 41b downwardly and simultaneously to retract the sleeve 96, turret 99, arms 102 and the bottle 103 downwardly into a clear position between the fully opened die holder halves 41a and 41b. The speed of electric motor is adjustable and, thus, the rate of incremental stepping of the turret assembly 68 is controlled by the speed of the motor. After the die holder halves are in their maximum open position, the gear box 80 energizes the drive shaft 69 through a preset arc to rotate the arm 102 to carry the imprinted bottle out of the clear space between the die holder halves and, at the same time, to move the next bottle to be printed into exact alignment between open mold halves 41a and 41b. The printed bottle is then removed either by hand or by an automatic removal device. The sequence is then repeated as described above, and successive bottles are printed in rapid succession by the apparatus of the present invention.

Figure 13:
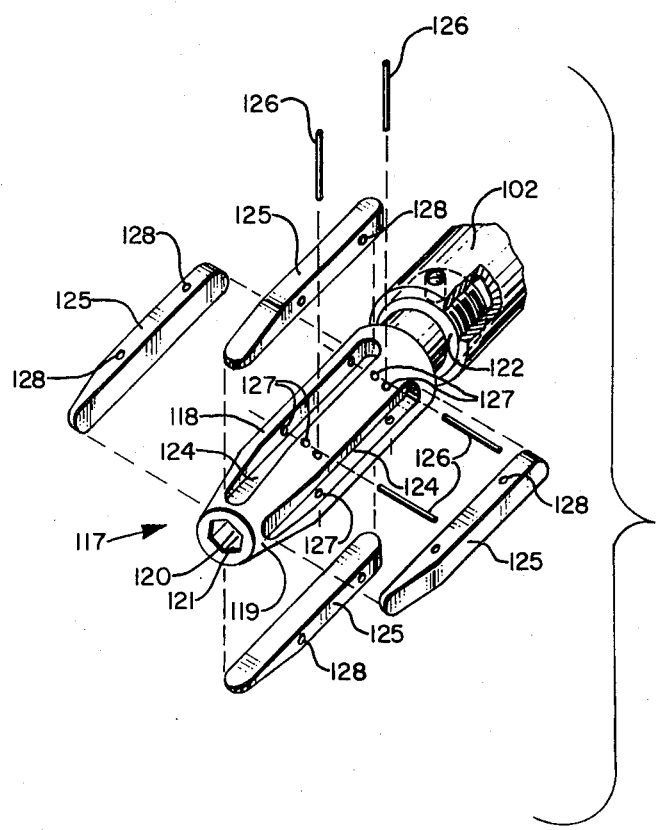
FIG. 13 is an exploded, elevational, perspective view of the expandable plug that is inserted in the container neck opening to support the container.
Figure 14:
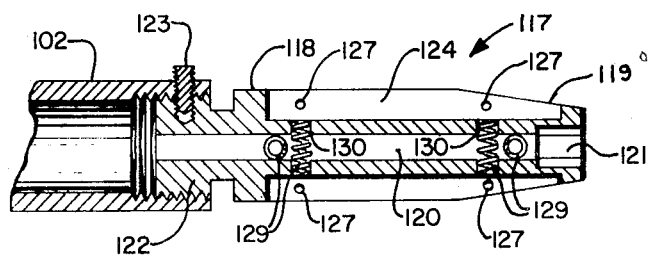
FIG. 14 is a longitudinal, sectional view of the expandable plug of FIG. 13.

As seen in FIGS. 13 and 14, each arm 102 that extends from the turret body 99 is provided at its end with an expandable plug member, designated generally 117, adapted to be received in the neck of the container 103 to hold the container on the arm 102. The plug member includes a generally cylindrical body 118 having a truncated, conical, forward end section 119. A longitudinal, axial bore 120 is provided in body 118 to supply compressed air to the interior of the bottle. The outer end of the bore 121 is hexagonally shaped to accept an Allen wrench for screwing the externally threaded rear end 122 of the body 118 into the internally threaded arm 102. A set screw 123 locks the body against rotation in arm 102. The body 118 is provided with four, evenly spaced apart, longitudinally extending grooves 124, each of which slidably receives a finger 125. Each finger is retained in its groove by means of a pair of pins 126—126 received in opposed openings 127—127 in the sidewalls of the body 118. Pins 126—126 pass through enlarged openings 128—128 provided in each finger 125. As seen in FIG. 14, springs 129—129 received in spaced apart, transverse openings 130—130 in the body bias each pair of opposed fingers 125—125 outwardly to force the fingers into tight engagement with the inner wall of the neck of the container.

While there has been described what is considered preferred embodiments for practice of the present invention, it will be understood that other methods and apparatuses may be utilized for carrying out the invention. The invention is to be solely limited by the claims.

What is claimed is:

1. In an apparatus for hot stamp printing of hollow plastic containers, the combination comprising:
 a. a split die holder having a cavity of substantially the same size and shape as said container;
 b. means rigidly positioning the first half of said split die holder with respect to the second half of said split die holder;
 c. means positioning a container between the open first half and second half of said split die holder;
 d. means simultaneously moving both the second half of said split die holder and said container into a position adjacent said first half to substantially enclose said container within said cavity; and e. means introducing a compressed fluid into the interior of said container.

2. In the apparatus of claim 1 wherein the means of subparagraphs (c) and (d) are interconnected.

3. In the apparatus of claim 1 wherein the means of subparagraph (d) include means for moving said container at a slower rate than the rate at which said second half of said split die is moved.

4. In an apparatus for hot stamp printing of hollow plastic containers, the combination comprising:
   a. a generally C-shaped support frame;
   b. a downwardly facing upper platen attached to the top arm of said frame;
   c. an upwardly facing lower platen movably attached to the bottom arm of said frame;
   d. a double acting, pneumatic power assembly attached to the back of said frame,
      i. said power assembly having a piston rod pivotably connected to said lower platen;
   e. a rotatable shaft attached to the outer ends of said top and bottom arms of said frame;
   f. a rotatable turret assembly having a plurality of transversely extending arms for mounting said containers thereon,
      i. said turret assembly being slidably mounted on said shaft and coupled thereto for rotation with said shaft;
   g. a link arm coupling said lower platen to said turret assembly to lower and raise said turret assembly with said platen;
   h. a split die holder having a cavity of substantially the same shape as said container,
      i. the top half of said die holder being attached to said upper platen and the lower half of said die holder being attached to said lower platen;
   i. means for supplying and transporting hot stamp foil to the cavity of said split die holder; and
   j. means for rotating said shaft to position a container between the open halves of said split die holder.

5. In the apparatus of claim 4 wherein said upper platen is attached to said top arm of said frame by means which permit adjustment of the position of said upper platen with respect to said lower platen.

6. In the apparatus of claim 4 wherein said lower platen is movably attached to said bottom arm of said frame by means of at least one guide rod having its upper end attached to said lower platen and its lower end slidably received in a sleeve guide mounted on said bottom arm of said frame.

7. In the apparatus of claim 6 wherein pairs of guide rods and sleeve guides are provided.

8. In the apparatus of claim 4 wherein said piston rod is pivotably connected to said upper platen by means of an upper link arm and to said bottom arm of said frame by means of a lower link arm.

9. In the apparatus of claim 4 wherein said link arm of subparagraph (g) has one end pivotably attached to said lower platen, the other end pivotably attached to a bracket, which bracket is attached to the bottom arm of said frame and extends upwardly therefrom, and is coupled to said turret assembly at a position between its ends.

10. In the apparatus of claim 4 wherein said turret assembly includes a lower sleeve member carried by and fixed to said shaft, an upper sleeve member slidably mounted on said shaft, said upper and lower sleeve members being connected by a plurality of slidably engaged fingers provided on the upper end of said lower sleeve and the lower end of said upper sleeve.

11. In the apparatus of claim 10 wherein said turret assembly includes a turret body mounted for vertical adjustment on said upper sleeve and adapted to be locked to said sleeve.

12. In the apparatus of claim 11 wherein said turret body is provided with an individual passageway for each of said plurality of arms to permit the introduction of a compressed fluid through said arms to the interior of the container mounted on each of said arms.

13. In the apparatus of claim 12 wherein said passageway has an opening on the top surface of said body which is engaged by a compressed fluid supply conduit attached to the top arm of said frame to supply compressed fluid to the interior of the container when said container is positioned within the cavity of said split die holder.

14. In a process for hot stamp printing of hollow plastic containers, the steps comprising:
   a. rigidly positioning the first half of a split die holder, said die holder having a cavity of substantially the same size and shape as said container;
   b. movably positioning the second half of said split die holder opposite and spaced from said first half of said split die holder;
   c. positioning said container between said first and second die holder halves;
   d. moving simultaneously both said second half of said die holder and said container into a position adjacent said first half to substantially enclose said container within said cavity; and
   e. introducing a compressed fluid into the interior of said container.

15. In the method of claim 14 wherein said compressed fluid is at a pressure of from about 95 to about 125 psig.

* * * * *